United States Patent Office 3,218,527
Patented Nov. 16, 1965

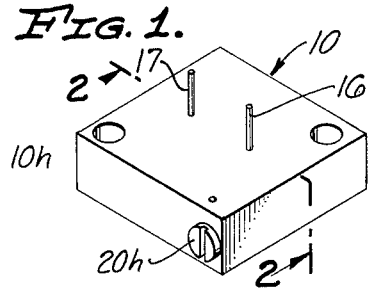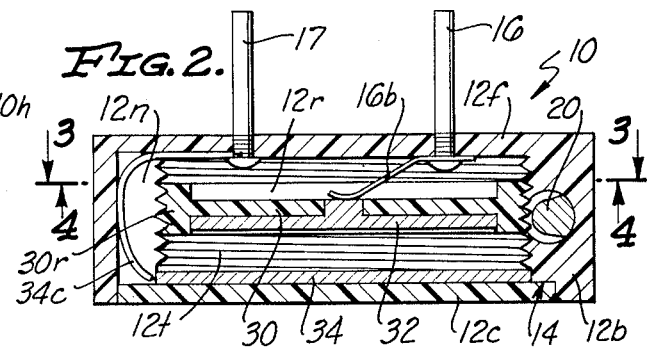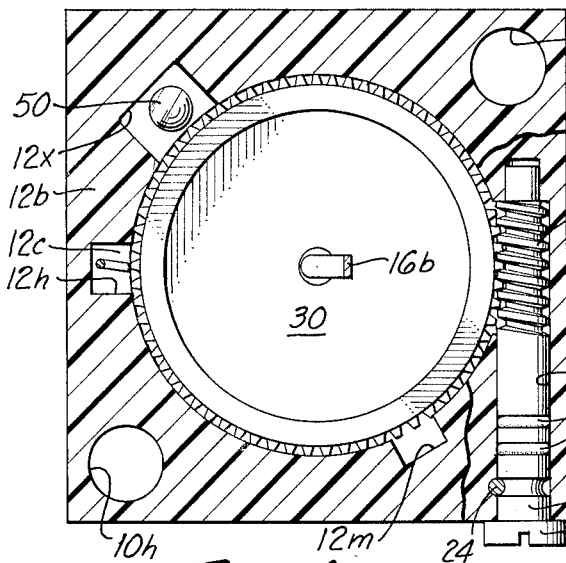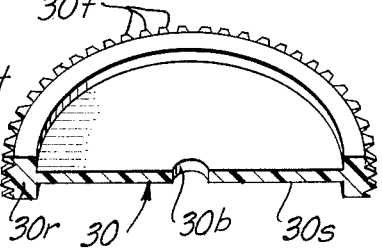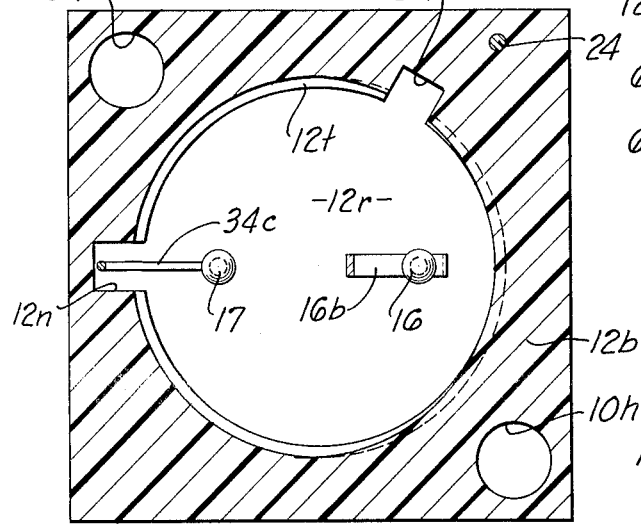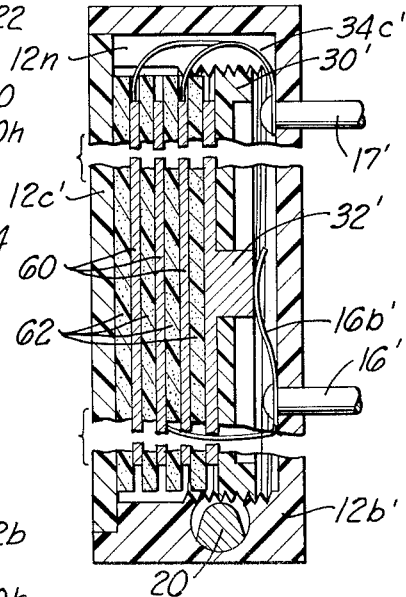
INVENTOR.
KENNETH F. MILLER
BY ace cover less hold against a step 14 as indicated

3,218,527
TRIMMING CAPACITOR
Kenneth F. Miller, Riverside, Calif., assignor to
Bourns, Inc., a corporation of California
Filed May 6, 1965, Ser. No. 453,578
6 Claims. (Cl. 317—249)

The invention hereinafter disclosed pertains to electrical capacitors and more particularly to small variable capacitors of the type known in the electronics arts as trimmer capacitors.

Trimmer capacitors of several constructions are included in the prior art. In one construction a cylindrical stator or base comprises a first capacitor plate or "electrode" of cylindrical form, and a second electrode or plate of cylindrical form is arranged to be moved into and out of the first plate by slide or screw means, the two cylindrical members being disposed in coaxial relationship. In another prior art form a disc plate is affixed to the end of a screw and is adjusted toward or away from a similar disc plate by rotation of the screw. A third construction is in the form of a miniature replica of the usual multiple-plate adjustable capacitor having a plurality of shaft-rotated electrically-connected rotor plates interleaved with a plurality of stator plates. All of the noted forms are characterized by one or more deficiencies or undesirable characteristics, such as large size per unit of capacitance, lack of stability of setting or adjustment under vibration, susceptibility to degradation caused by dust or foreign material entering between the plates, coarseness of adjustment, and lack of adaptability to use on etched-circuit panels or boards.

According to the present invention a variable capacitor has plates or electrodes of simple form or shape, for example cylindrical or circular plates, two or more in number, enclosed in a protective insulative housing, which electrodes include a first or stationary electrode and a second, movable electrode movable toward and away from the fixed electrode, there being selected dielectric means disposed between the plates. The dielectric is selected to provide, in a family of trimmer capacitors that are otherwise mechanically identical, a wide range of maximum values of capacitance, as will be later explained in detail. The noted movable electrode, hereinafter termed the rotary electrode to distinguish it from any other movable electrodes that may be included in the capacitor, is disposed, constructed and arranged to be precisely moved in substantially infinitely-small increments toward and from capacitive intimacy with the fixed or stationary electrode, and maintained positively in any set attitude by being mounted on or formed as a part of a novel driven screw-and-gear device having a screw-thread complementary to and engaging a stationary screw thread of large diameter and fine pitch, provided on the interior of the housing the screw-and-gear device having gear teeth engaged with complementary driving means of a driving screw or gear means that is exposed for rotation from the exterior of the housing. The cooperative interaction of the gear teeth or structures and of the screw threads, serve to effect desired adjustments when the gears are purposefully rotated, and in addition serve to prevent undesired relative displacement between gear-and-screw device and the stationary parts under the influence of vibration. By virtue of the novel screw-thread arrangement being of large diameter and the pitch thereof being relatively fine, very precise adjustment of the gear-carried rotatable electrode toward or away from the fixed plate is possible; and by virtue of the screw-thread arrangement and the gear arrangement, disturbance of the adjustment incident to capacitor vibration is made extremely unlikely, as will hereinafter be made fully evident. Also, by virtue of selection of one of a family of available fluid dielectric materials, the capacitance range of the capacitor is made to conform to any desired one of a large set of capacitance ranges. The housing is constructed and arranged to be sealed, and to be mechanically secured as by mounting screws, to any adaptable supporting structure. Further, terminal devices connected to the electrodes or plates are preferably but not necessarily constructed and arranged to serve to mount and connect the capacitor to etched-circuit panel or board structures.

The foregoing brief general description of the invention indicates that it is an object of the invention to provide improvements in adjustable capacitors of the type used for trimming electronic circuits.

Another object of the invention is to provide a simple but extremely rugged small adjustable capacitor that is capable of operating satisfactorily over long periods of time under adverse environmental circumstances in respect of humidity, foreign material and vibration.

Another object of the invention is to provide improvements in means for adjusting small variable capacitors.

It is another object of the invention to provide a small variable capacitor capable of extremely close adjustment.

Another object of the invention is to provide an inexpensive extremely reliable variable capacitor.

An additional important object of the invention is to provide a variable capacitor construction whereby by selecting one of a family or group of available fluid dielectric materials, capacitors of widely varying maximum capacitances may be made up from otherwise identical mechanical structures by introduction of a selected dielectric material.

Another object of the invention is to provide self-locking capacitance-varying means for small variable capacitors.

Other objects and advantages of the invention will hereinafter be stated or made evident in the appended claims or in the following detailed description of a preferred physical embodiment of capacitor according to the invention and in which description references are made to the accompanying drawings comprising a part of this specification. In the drawings:

FIGURE 1 is a pictorial view, to no particular scale, of an exemplary variable capacitor, showing spatial configuration and arrangement of external details;

FIGURE 2 is a sectional view, to a scale other than that of FIGURE 1 and taken on a plane and viewed in the direction indicated by broken line 2—2 of FIGURE 1, showing internal details of construction of the simplest form of exemplary capacitor;

FIGURE 3 is a sectional view, to an arbitrary scale and viewed on a plane and in a direction as indicated by arrows and broken line 3—3 in FIGURE 2;

FIGURE 4 is a sectional view similar to FIGURE 3 but in a direction indicated by arrows 4—4 in FIGURE 2;

FIGURE 5 is a view partly in section, of a gear-and-screw member comprised in the illustrated exemplary capacitor; and FIGURE 6 is a fragmentary sectional view illustrating a modified form of construction applicable to the illustrated preferred embodiment of capacitor according to the invention.

Referring first to FIGURES 1 and 2, the exemplary capacitor structure or device is denoted generally by ordinal 10. It includes housing means in the form of a rectangular box-like case comprising a base 12b and a shaped preferably circular plate-like cap or cover 12c which fits tightly in a complementary recess formed in one face of the base and rests against a step 14 as indicated at the lower right in FIGURE 2. The base 12b serves as a body and support for operating instrumentalities of the device. It is provided with means whereby the capacitor may be secured to other devices, one such mounting means being in the form of mounting holes 10h disposed as shown; and alternative other means being in the form of terminal pins 16 and 17 that are securely fixed in place in the floor 12f of the base and are structurally arranged to be inserted into holes in a circuit board. Base 12b is provided with a generally circular recess or cavity 12r at least a principal part of the circular wall of which is provided with a preferably fine-pitch screw thread 12t (FIGURES 2 and 4). The base further is provided with a stepped bore 12w (FIGURE 3) that is dimensioned to receive the shank and thread of a driving gear in the form of a wormscrew 20.

The wormscrew has a reduced inner end that is rotatably borne in the reduced inner end of more 12w; and has a threaded portion 20t that is exposed along a region in which the bore 12w and the recess 12r intersect. Further, the wormscrew has a shank portion provided with circumferential grooves, at least one of which grooves receives a sealing device here depicted as a complementary O-ring 22, which device serves to seal the bore against passage of foreign material. Another of the noted grooves accommodates a portion of a retainer-pin 24 that is received and set in a bore formed transverse to and intersecting bore 12w, all as indicated in FIGURE 3. The wormscrew is adapted to be manually rotated in the bore, as by means of a tool such as a screw driver engaged with a head 20h of the wormscrew The wormscrew serves as a driving device or gear for driving a gear-and-screw member 30 (FIGURES 2 and 3), with which the threaded portion 20t of the wormscrew is complementary and is engaged. The member 30 (FIGURE 5) comprises an annular rim 30r the outer periphery of which is threaded for screw-thread engagement with the thread 12t formed in the fall of the generally circular recess of base 12b. Further, the annular rim is provided with gear teeth 30t that, as noted, are complementary to the teeth or screw-thread portion of wormscrew 20. As will be evident, the screw thread on member 30 will be interrupted by the gear teeth, and vice versa; however, the thread, and each gear tooth will comprise a respective series of somewhat pyramidal formations separated by intervening spaces in which the thread of the base 12b and the tooth or thread of wormscrew 20, respectively, are received. Thus, incident to rotation of wormscrew 20, member 30 will be rotated; and as the driven gear-and-screw member 30 is rotated, it will traverse axially in recess 12r in the manner of a screw in a nut, due to the ineraction of the screw-thread formations.

The traversing motion of gear-and-screw member 30 is utilized to effect change of separation of capacitor plates, and hence change of capacitance of the capacitor. To the noted end, member 30 in the simplest exemplary form illustrated is provided at one face with a recess 30s (FIGURE 5) and at its center with an axial bore 30b, in which recess and bore a hubbed generally circular electrode plate 32 (FIGURE 2) is secured as by means of press-fitting adhesive, or the like. The plate 32 is insulated from wormscrew 20, preferably by forming member 30 of insulation such as ceramic or a phenolic resin or the like; or alternatively but less desirably by suitable insulation interposed between the plate 32 and member 30, as will be evident to those skilled in the art. The hub of plate 32 extends through bore 30b of the gear-and-screw member 30 and is accessible at the opposite face of the latter, for electrical contact or engagement by a strong resilient conductive brush 16b carried by and electrically connected to terminal pin 16 at the interior end of the latter. Thus electrical connection with plate 32 is effected irrespective of the position of traverse of member 30 along the interior thread 12t of the housing base. Preferably, and as indicated in FIGURE 2, the noted opposite face of member 30 is recessed, whereby to provide clearance for accommodation of the brush 16b as member 30 is driven to the upper limit of traverse.

Also disposed within the cavity or recess provided by base 12b, is a second capacitor electrode, or fixed plate, 34. Plate 34 is adapted to fit in a cylindrical portion of recess 12r, and may be held in position therein by adhesive or may alternatively be adhesively secured to cover 12c of the housing. In either case, direct contact of movable plate 32 with fixed plate 34 is prevented by making the recess in member 30 in which plate 32 fits, of greater depth than the thickness of plate 32. Thus the insulated lower face of the rim of member 30 may be driven into contact with fixed plate 34 without bringing the two metallic plates into electrical contact.

Electrical communication with fixed plate 34 is provided by an insulated conductor 34c (FIGURES 2 and 4) which is fusion-united at one end with an edge of plate 34 and at the other end with the interior head of terminal pin 17. Clearance space for conductor 34c around the path of screw-gear member 30 is provided by a wall-notch 12h (FIGURES 2, 3, 4) formed in the interior wall of base 12b. As is evident to those skilled in the art, the housing members 12b and 12c are preferably formed of low-loss dielectric material such as ceramic; and wormscrew 20 may likewise be formed of non-metallic material whereby to reduce the effect of extraneous capacitive links.

To increase the capacitance provided by the fixed and movable electrodes when air is the dielectric, and to permit the aforedescribed structure to be used to provide in instruments of the same size a wide range of electrical capacitances, the otherwise unoccupied interior space in the housing is filled with a fluid dielectric, chosen from available dielectric fluids in accord with desired capacitance range, cost, temperature stability required, operating-temperature extremes, and other design criteria. The fluid dielectric, not illustrated in the drawings since in some instances it may be in gaseous or vapor form and in others may be a transparent liquid and in some cases an opaque viscous grease or jelly-like material, is displaced in part as the movable parts move, and is permitted to expand and/or contract by inclusion of an elastic gas-filled device in the housing. For example, a gas-filled elastic cell 50 disposed in a recess 12x (FIGURE 3) formed in base 12b is preferably provided to accommodate expansion and contraction of the dielectric fluid without adverse effect upon the capacitance. Obivously, a sealed elastic cellular foam of chemically inactive material may be used in the housing recess 12x for the indicated purpose, the choice being dependent upon the nature of the dielectric fluid used.

Capacitance is directly proportional to the dielectric constant of the fluid used, whether air, other gas, or liquid; and hence it is seen that all that is required to increase the maximum capacitance (with air as the dielectric) to a desired higher value is to fill the housing with an appropriately selected fluid dielectric. For example, dibutyl phthalate, having a dielectric constant of approximately 3.2 may be used. Similarly, vacuum oil (Cenco vacuum pump oil) having a dielectric constant of 1.4 may be used. Thus an exemplary capacitor according to the invention had a maximum capacitance of 18.2 pfd. using dry air as the dielectric, 25.4 pfd. using vacuum pump oil as the dielectric, 58.5 pfd. using dibutyl phthalate as the dielectric, and 83.0 pfd. using analine as the dielectric. Thus the capacitance may be "tailored" to meet requirements by judicious selection of the dielectric fluid, the mechanical structure of the capacitors being otherwise identical. Further intermediate gradations of maximum capacitance value can be attained in many instances by using dispersions or mixtures of compatible fluid dielectrics. For example, in the abovementioned exemplary capacitor a maximum capacitance value of 33.5 pfd. was attained by using a 50%—50% dispersion of dibutyl phthalate in vacuum pump oil, which capacitance value is between the values determined using the ditioning the two constituents, other inermediae capaci tioning the two constituents, other intermediate capacitance values are readily attained.

In using fluid dielectrics other than air, care must be exercised to use fluids having suitably low values of electrical conductivity; and, in those environmental applications in which large temperature changes must be accommodated, fluid dielectrics of low electrical conductivities but characterized by excessive variation of dielectric constant with temperature should not be employed. As is evident to those skilled in the art, selection of the fluid dielectric may also be governed or controlled by certain expected environmental conditions. For example, for service restricted to or involving very low temperature ambient environment, dielectric fluids which "freeze" or solidify at temperatures above the expected minimum temperature must be ruled out; and similarly, if the expected service environment includes ambient temperatures in excess of the boiling point of certain liquid dielectrics, those liquids must be excluded from the list of eligible fluids in such case. Also, certain dielectric fluids, due to excessive variation of dielectric constant with temperature variation, should not be used except for capacitors to be operated only within prescribed upper and lower temperature limits. Thus it is seen that the dielectric fluid to be employed is chosen from among many such dielectrics now available. Arbitrarily selected fluid dielectrics available for use, subject to the above-indicated restrictions, and the dielectric value (approximate), are listed in Table I.

*Table I*

| Dielectric: | Dielectric constant (approx.) |
|---|---|
| Air | 1.0 |
| Cenco vacuum pump oil | 1.4 |
| 50/50 vacuum pump oil, dimethyl phthalate | 1.95 |
| Dow Corning 200 Electronic Fluid | 2.75 |
| Dibutyl phthalate | 3.2 |
| Nitrobenzene | 3.95 |
| Analine | 5.22 |
| Dow Corning "FS1265" Fluorosilicone | 7.35 |

As is evident to those skilled in the art, the minimum capacitance is determined by the plate area, the minimum plate separation and the dielectric constant of the dielectric used. Hence the size of screw-gear member 30 may be selected to accommodate a plate 32 of area A sufficient to provide the highest value of the minimum capacitance desired in a family of capacitors, and plates 32 and 34 of areas less than that maximum plate area may be used, in combination with a selected one of a family of fluid dielectrics, to obtain capacitance ranges of a wide variety of values, all with mechanical components of identical construction.

A modified form of variable capacitor according to the invention is depicted in fragmentary form in FIGURE 6. Therein are shown only such portions of components as are required for purposes of explanation, the fine-pitch gear-and-screw member 30', the driving wormscrew 20, and the housing including base 12b' and cover 12c' being substantially the same as those previously described. In the modified form of capacitor a plurality of metallic discs 60 are spaced apart by a set of compressible elastic discs 62 of foamed insulation such as porous open-celled polyurethane foam. Alternate ones of discs 60 are connected by flexible insulated conductor means disposed in sidewall notch 12n to one terminal, such as 17', and intervening ones of the discs 60 are similarly connected to the other terminal, such as 16', utilizing a second flexible insulated conductor disposed in a second branch recess 12m (FIGURES 3 and 4) provided in the side wall of cavity 12r. As is evident, traverse of member 30' incident to rotation of the wormscrew 20 will cause compression (or permit expansion) of the elastic insulative foam discs 62, and the capacitance exhibited between terminals 16' and 17' thereby varied. Obviously, the thickness and the number of discs of metal and of intervening elastic discs of insulative foam may be varied to bring the total maximum capacitance, and the range of capicitance variation, to desired values. Extra or surplus space may if desired be occupied as required by rigid insulation of required thickness disposed adjacent cover 12c', as is evident to those skilled in the art.

It is thought to be clear that by virtue of the nature of the periphery of gear-and-screw member 30 (or 30') and the interengagement thereof with the fine-pitch screw thread 12t in the wall of cavity 12r and with the thread 20t of wormscrew 20, the driven gear-and-screw member is securely locked against undesired rotation by vibration induced forces, and the adjustment of the capacitance may be made in very small increments and is with certainty maintained. Also it is evident that upon sealing of housing cover 12c in place, entrance of foreign matter into the capacitor is substantially prohibited. As will also be evident, the capacitor may be inexpensively made by forming the housing parts and the gear and screw members of molded insulation and the metal electrodes as stamped parts, the assembly procedure being obviously simple.

The preceding detailed description indicates full attainment of the aforementioned objects of the invention. In the light of the disclosure of a preferred exemplary capacitor incorporating the principles of the invention, changes and modifications within the true spirit and scope of the invention will occur to those skilled in the art. Accordingly it is not desired to restrict the scope of the invention to specific details of the described structure, but rather only as required by the appended claims.

I claim:
1. A variable capacitor comprising:
    first means, including supporting means for supporting operating components of the capacitor, said first means providing a cavity bounded at least in part by a surface having at least segments of a large-diameter female screw thread defining a helical path disposed around an axis extending through the cavity;
    second means, including as an operating component of the capacitor a driven rotary member having a rim, said rim provided with male thread means complementary to and engaged with said female screw thread for traverse of said member along said axis incident to rotation of the member, said member having a circular series of gear teeth thereon;
    third means, including as an operating component of the capacitor a rotatable driving member supported by said first means and engaging the teeth of said driven rotary member to rotate the latter to traverse the driven rotary member along said axis by screw-thread interaction, incident to rotation of said driving member;
    fourth means, including a first capacitor electrode supported by said first means in said cavity;
    fifth means, including a second capacitor electrode carried by said rotary member for traverse therewith in the direction of said axis and alternatively into close or remote proximity to said first electrode depending upon the direction of rotation of said rotary member, to effect variation of the electrical capacitance exhibited by the capacitor; and
    sixth means, including electrical connections to respective ones of said capacitor electrodes, extending to the exterior of said first means.
2. A variable capacitor according to claim 1,
    said first means including a box-like housing providing said supporting means, said housing including a base and a cover, said base having a cavity bounded in part by a peripheral wall forming said surface and said surface having said female thread, and said base having a bore therein receiving and rotatably supporting said driving member, and said cover having affixed thereto said first capacitor electrode and said cover being sealed to said base to seal said cavity, whereby said cavity is sealed and said electrodes are protected from foreign material in the ambient around said cavity.

3. A variable capacitor according to claim 2, in which said cavity contains a fluid dielectric other than air.

4. A variable capacitor according to claim 3, in which said fluid dielectric is a liquid dielectric, and in which said first means comprises an elastic variable-volume cell to accommodate expansion and contraction of said liquid dielectric.

5. A variable capacitor according to claim 1, including in spaced-apart relationship with respect to each other and to said first capacitor electrode and said second capacitor electrode, third and fourth electrodes each connected to a respective one of said first and second electrodes and separated therefrom and from each other by interposed members of elastic insulative foam, whereby the total capacitance of said capacitor is increased.

6. A variable capacitor according to claim 5, in which said electrodes are of disc-like form.

References Cited by the Examiner
UNITED STATES PATENTS

| | | | |
|---|---|---|---|
| 1,608,085 | 11/1926 | Douglas | 317—249 |
| 1,652,376 | 12/1927 | Sartakoff | 317—249 |
| 2,014,930 | 9/1935 | Gebhard et al. | 317—249 |
| 3,090,021 | 4/1963 | Barnes | 317—249 X |

ROBERT K. SCHAEFER, *Acting Primary Examiner.*

UNITED STATES PATENT OFFICE
CERTIFICATE OF CORRECTION

Patent No. 3,218,527                      November 16, 1965

Kenneth F. Miller

It is hereby certified that error appears in the above numbered patent requiring correction and that the said Letters Patent should read as corrected below.

Column 1, line 54, for "housing" read -- housing, --; column 3, line 16, for "more" read -- bore --; line 29, for "wormscrew" read -- wormscrew. --; line 49, for "ineraction" read -- interaction --; column 5, lines 2 and 3, strike out "tioning the two constituents, other inermediae capaci tioning the" and insert instead -- electrics individually. Obviously by differently proportioning the --; column 6, line 5, for "capicitance" read -- capacitance --.

Signed and sealed this 20th day of September 1966.

(SEAL)
Attest:

ERNEST W. SWIDER                         EDWARD J. BRENNER
Attesting Officer                            Commissioner of Patents